Inventor
Fred J. Helgren

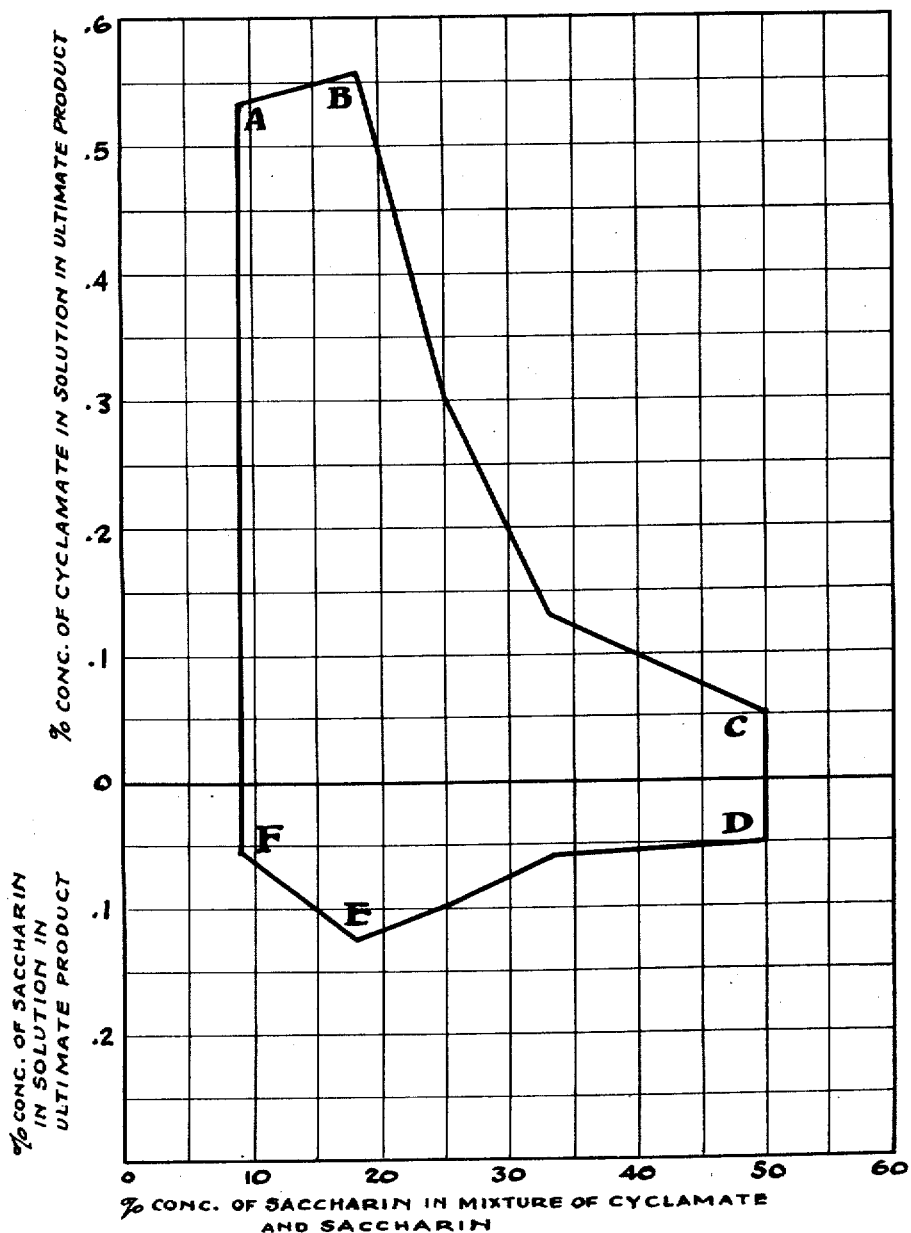

United States Patent Office 2,803,551
Patented Aug. 20, 1957

2,803,551

SWEETENING COMPOSITIONS AND METHOD OF PRODUCING THE SAME

Fred J. Helgren, Waukegan, Ill., assignor to Abbott Laboratories, North Chicago, Ill., a corporation of Illinois Application August 29, 1955, Serial No. 531,214

11 Claims. (Cl. 99—141)

This invention relates to sweetening compositions and more particularly to a composition comprising an edible salt of cyclamate and an edible salt of saccharin.

The synthetic sweetening agents have always had an important place in the diet of persons who must necessarily restrict their intake of sugar, such as diabetics. More recently, a much larger group of people has become conscious of the synthetic sweeteners as more and more emphasis is placed on low calorie diets for obese and overweight persons. The two synthetic sweeteners which have achieved the greatest degree of acceptance are cyclamate and saccharin and these are recognized as being harmless in usual amounts.

The use of saccharin as a sweetening agent has always been limited by the off-taste which many people experience when taking the compound. The off-taste is described in the older literature as being metallic, bitter, disagreeable and after-taste, and the incidence of such off-taste has been reported in varying degrees. It has been reported previously that about 25 to 33⅓% of the population got an off-taste from saccharin regardless of concentration and that these people were "saccharin sensitive." Other older reports have been made to the effect that the off-taste is due to decomposition products or to impurities which carry over in the manufacture of the compound.

It is now known as a result of statistically sound taste panel studies that the incidence of off-taste in saccharin is a function of the concentration of the compound and that everyone can be expected to obtain an off-taste from saccharin at one concentration or another. As shown in Figure 1, the off-taste of sodium saccharin is approximately a straight line function of the percent of tasters reporting off-taste plotted against the log of the concentration. This taste panel data has established that 20% of the population can be expected to detect an off-taste in sodium saccharin at concentrations above about 0.021%; 50% of the population will detect the off-taste in concentrations above about 0.07% and 80% of the population will experience off-taste at concentrations above about 0.22%.

Likewise, it has been previously reported that salts of cyclamate (cyclohexylsulfamic acid) could be used indiscriminately below certain concentrations (approximately 0.8% for sodium cyclamate and 0.5% for calcium cyclamate) and that above these critical levels an off-taste might be experienced. While this off-taste is not the same as that reported for saccharin, it is definitely not the clean, sweet taste normally associated with cyclamate in low concentrations. It has now been established, however, by statistically sound taste panel studies that the off-taste response of cyclamate is also a function of the concentration, and the off-taste limit curve is approximately a straight line function of the percent of tasters reporting off-taste plotted against the log of the concentration. In Figure 2 the off-taste response of the taste panel group is plotted against the log of the concentration of sodium cyclamate and it will be seen that 20% of the population can be expected to report an off-taste for sodium cyclamate at concentrations higher than 0.43%; 50% of the population can be expected to report an off-taste response at concentrations above about 0.66% and 80% of the population can be expected to report an off-taste in concentrations above about 1.05%.

It will be apparent from the foregoing information that both cyclamate and saccharin have definite limitations on the amount of each which can be used without causing an off-taste in a significant proportion of the population. These limitations are the more significant when the sweetness of concentrations of saccharin and cyclamate are compared to sucrose. In these comparisons it has been determined by statistically sound taste panel techniques that the actual sweetness of the concentration of sodium saccharin at which 20% of the population report an off-taste (0.021%) is about equal to that of a 3½% sucrose, a comparatively moderate sweetness (see Figure 4). For sodium cyclamate, the sweetness at the concentration where 20% of the population reports an off-taste (0.43%) is roughly equivalent to that of a 6% sucrose solution, again a relatively moderate sweetness.

Another factor enters into the consideration of the sweetness of the synthetic sweetening agents. When the concentration of the synthetic sweetener is increased, the relative sweetness compared to sucrose falls off rapidly. For example, it is known that saccharin is about 350 times as sweet as sucrose on a weight-for-weight basis in low concentrations giving a sweetness actually equivalent to 2½% sucrose. When the concentration of saccharin is increased to give a sweetness actually equivalent to about 4% sucrose, the saccharin is only about 90 to 110 times as sweet as sucrose. In other words, to obtain more than a relatively moderate sweetness level it becomes necessary, because of diminishing relative sweetness, to employ such large concentrations of saccharin as to cause an off-taste in a substantial proportion of the population. In effect therefore, there is a practical limit to the sweetness level that can be obtained with saccharin alone and this level is surprisingly low, not exceeding the sweetness of about a 4% solution of sucrose.

The same is true of the cyclamates, that their relative sweetness as compared to sucrose diminishes as the concentration of the cyclamate is increased. For example, it has been determined by statistically sound taste panel techniques that cyclamate sodium is approximately 31 times as sweet as sucrose at low concentrations equivalent to about a 2.5% sucrose solution. When the concentration of cyclamate sodium is increased to a point high enough to compare in sweetness with a 6% sucrose solution, it is found that the cyclamate sodium is then only about 15 times as sweet as sucrose. At this concentration it is demonstrated that not more than 20% of the population report an off-taste from cyclamate sodium, but attempts to increase the level of sweetness by increasing the concentration of cyclamate sodium very quickly brings one into the range where more than 20% of the population can be expected to report an off-taste. Hence, in this sweetener also there is, in effect, a level of sweetness above which one cannot safely go without causing a high incidence of off-taste.

Because of the off-taste response shown in Figures 1 and 2 and explained in detail hereinbefore, it has been decided that comparisons should be made at the concentrations at which 20% of the population detect off-taste in a given sweetener. The 20% off-taste level will sometimes be referred to hereinafter as the $OT_{20}$, and it represents a level which cannot safely be exceeded in a product intended for widespread public acceptance.

It is therefore a principal object of this invention to provide a composition which will overcome the above-described disadvantages and limitations of artificial sweeteners.

Another object of the invention is to provide combinations of salts of cyclamate with salts of saccharin in which the characteristic bitter off-taste of saccharin is masked or inhibited for that segment of the population which normally reports a bitter taste even at low concentrations of saccharin.

A further object of the invention is to overcome the off-taste of the cyclamates.

Still another object of the invention is to provide an artificial sweetening composition which may be used to give a level of sweetness equivalent to high sugar concentrations without significant off-taste.

These and other objects and advantages of the invention will be apparent from a consideration of the following detailed description of the invention taken in conjunction with the accompanying drawings in which:

Figure 1 is a graph showing the least squares regression line obtained by plotting the percent of tasters reporting off-taste vs. the logarithm of the percent saccharin sodium U. S. P. in distilled water submitted to the tasters;

Figure 2 is a graph showing the least squares regression line obtained by plotting the percent of tasters reporting off-taste vs. the logarithm of the percent cyclamate sodium in deionized water submitted to the tasters;

Figure 3 is a graph of the least squares regression line obtained by plotting the percent of tasters reporting an off-taste vs. the logarithm of the percent of cyclamate sodium and saccharin sodium U. S. P. in 10–1 combination in deionized water, as submitted to the tasters;

Figure 5 is a graph of the 20% off-taste curve ABCDEF obtained by plotting the percent concentration of saccharin and the percent concentration of cyclamate in ultimate solution in products sweetened with the combination vs. the percent concentration of saccharin in the mixture of the two sweeteners.

Figure 1:
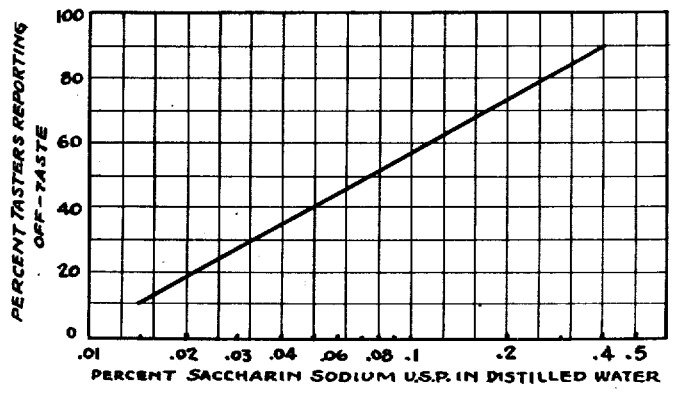

It has now been found in the practice of this invention that the disadvantages of both cyclamate and saccharin can be overcome by combining the two in certain critical proportions of between about one and ten parts by weight of cyclamate per part by weight of saccharin within certain well-defined concentration limits. In this combination the off-taste of both, and particularly of saccharin, is inhibited or substantially completely covered up in the low and moderate concentrations, and it is possible to achieve a clean, sweet taste at relatively high sugar equivalent levels (above about 10%) with no more than a 20% incidence of off-taste.

The new compositions of matter covered by this invention comprise a mixture of edible or pharmaceutically acceptable salts of cyclamate and saccharin in which mixture saccharin comprises from about 9% to about 50% of the total weight. When the mixture is dissolved in edible aqueous media, the solution thus obtained must have the cyclamate and saccharin present in concentrations which fall within the area bounded by the curve ABCDEF in Figure 5. When so constituted and so diluted, the ultimate solution or product will result in a sweet taste without off-taste in about 80% of the population.

Interpreting Figure 5 in more detail, it will be observed that the percent of cyclamate in the ultimate product and the percent of saccharin in the ultimate product are plotted as the ordinate against the percentage concentration of saccharin in the bulk mixture of cyclamate and saccharin which is used in obtaining the final product as the abscissa. For convenience in reading the relative amounts of cyclamate and saccharin which must be combined in the practice of the invention, the two curves are separated by the base line 0 which is parallel to the abscissa. In reading the curve, one first determines the percentage concentration of saccharin in a given mixture of cyclamate and saccharin and then reads from that point on the abscissa the percentage concentration of cyclamate and of saccharin which can be tolerated in the ultimate solution without producing more than a 20% incidence of off-taste. For example, a product which contains 25% saccharin in the mixture of cyclamate and saccharin can be used in ultimate concentration in the final sweetened product at a cyclamate concentration up to about 0.3% and the saccharin may be used in ultimate concentration in the final product up to about 0.1%. If more than 0.3% cyclamate is used with 0.1% saccharin, the reference point on the abscissa is shifted to the left and so long as the amounts of cyclamate and saccharin do not fall outside the boundary of the curve ABCDEF the 20% off-taste limit will not be exceeded. Hence, it is possible with any given concentration of cyclamate and saccharin in admixture to determine readily whether it falls within the boundary established by the curve ABCDEF and if it falls within said boundary, the mixture is considered to be covered by this invention.

It is possible through the use of the combination of sweeteners in the critical proportions which are a part of this invention to achieve sweetness levels equivalent to as much as 26% sucrose without experiencing more than a 20% incidence of off-taste. This degree of sweetness is high enough to enable one to obtain the desired sweetness in most consumer products including syrups, candies, and the like, which are classed as very sweet products.

Figure 4:
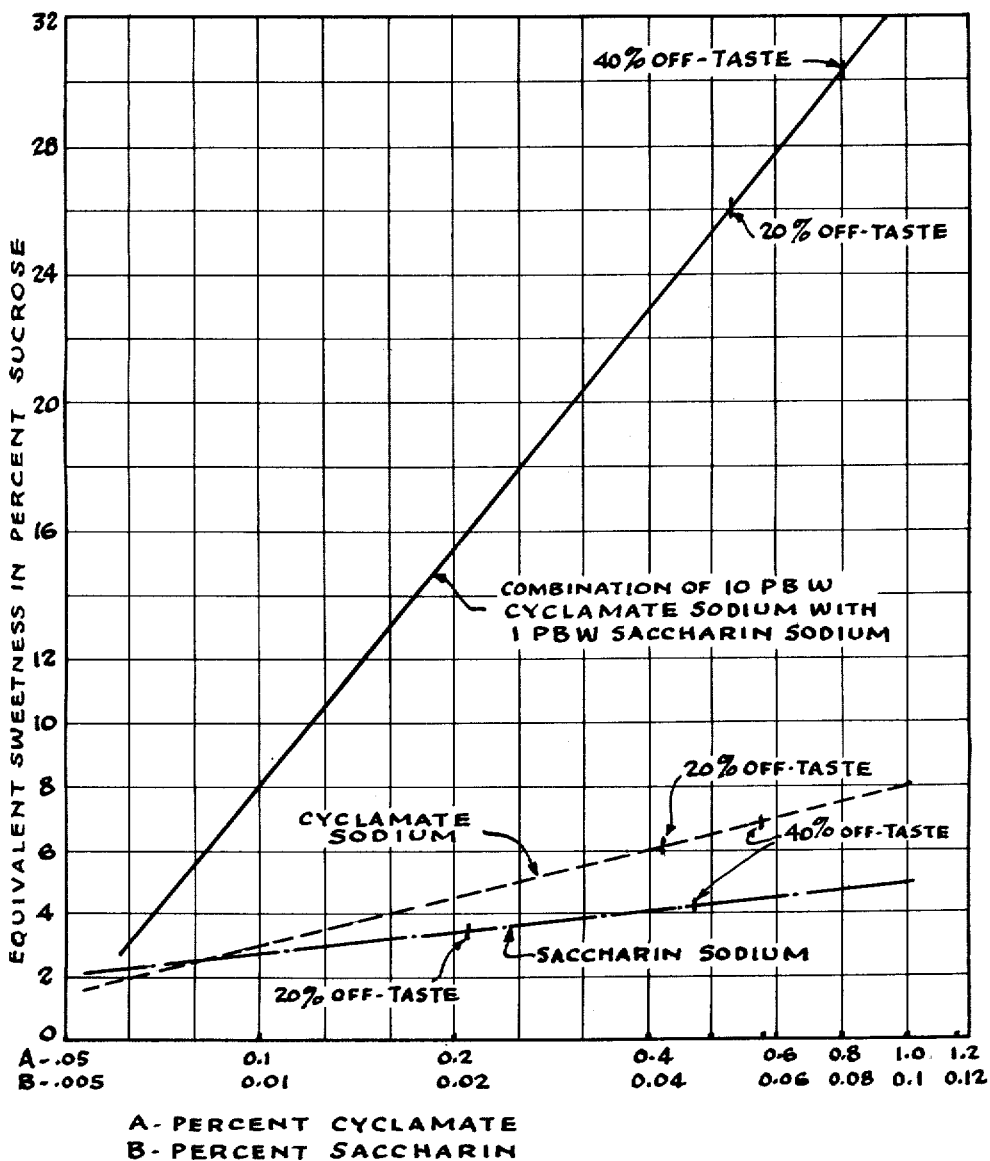
Figure 4 is a graph showing the lines obtained by plotting the degree of sweetness of tested solutions (as determined by actual taste comparison to sucrose solutions of varying concentrations) against the logarithm of the concentration of the various solutions submitted to the tasters.

A very important feature and advantage of the present invention is the greatly enhanced sweetness of the claimed combinations as compared to the expected additive sweetness of the components of the combination. In other words, when cyclamate and saccharin are combined in the proper proportions, a synergistic sweetness is obtained in the combination which is at least about 70% greater by actual comparison with sugar than would be expected from the summed sweetness of the components of the mixture. In Table I the synergistic sweetness of combinations of cyclamate sodium and saccharin sodium at the 20% off-taste level is recorded. Taking the 1:1 combination as an example, it will be seen from Table I that cyclamate sodium and saccharin sodium can be combined in 0.05% w./v. concentrations at the 20% off-taste level. Referring to Figure 4, it is noted that 0.05% saccharin sodium is equivalent in sweetness to 4.25% sucrose when considered alone. Likewise from Figure 4, it can be seen that 0.05% cyclamate sodium is equivalent in sweetness to 1.5% sucrose when considered alone. It would be expected, therefore, that the two sweeteners might have an additive sweetness (column D of Table I) equivalent to that of a 5.74% solution of sucrose. Actually, however, when 0.05% of cyclamate sodium and 0.05% of saccharin sodium are combined and compared in sweetness to sucrose, there is no significant difference between this combination and 10% sucrose (column C of Table I). The actual sweetness of the combination is therefore 73% greater than the expected additive sweetness. Reading the other combinations in Table I in the same manner, it will be seen that the actual sweetness of the various combinations listed is from 73% to 140% greater than the expected additive sweetness of the components of the combination. This "bonus" sweetness demonstrated by the combination makes possible the attainment of levels of sweetness never before possible with artificial sweeteners.

TABLE I

*Synergistic sweetness of combinations of cyclamate and saccharin at the 20% off-taste level*

| Sample | A Cyclamate Sodium, percent w./v. | B[1] Saccharin Sodium, percent w./v. | C Actual Sweetness Equiv. to Sucrose, percent | D Expected Additive Sweetness of A and B, Sucrose, percent | Synergism $\frac{C-D}{D}$, percent |
|---|---|---|---|---|---|
| 1 | 0.05 | | 1.5 | | |
| 2 | | [1] 0.05 | 4.25 | | |
| 3 | 0.05 | [1] 0.05 | 10 | 5.75 | 73 |
| 4 | 0.128 | | 3.6 | | |
| 5 | | [1] 0.065 | 4.5 | | |
| 6 | 0.128 | [1] 0.065 | 15 | 8.1 | 85 |
| 7 | 0.297 | | 5.3 | | |
| 8 | | [1] 0.099 | 5.0 | | |
| 9 | 0.297 | [1] 0.099 | 23 | 10.3 | 123 |
| 10 | [1] 0.556 | | 6.6 | | |
| 11 | | [1] 0.124 | 5.25 | | |
| 12 | [1] 0.556 | [1] 0.124 | 25 | 11.85 | 111 |
| 13 | [1] 0.533 | | 6.5 | | |
| 14 | | [1] 0.053 | 4.3 | | |
| 15 | [1] 0.533 | [1] 0.053 | 26 | 10.8 | 140 |

Figure 2:
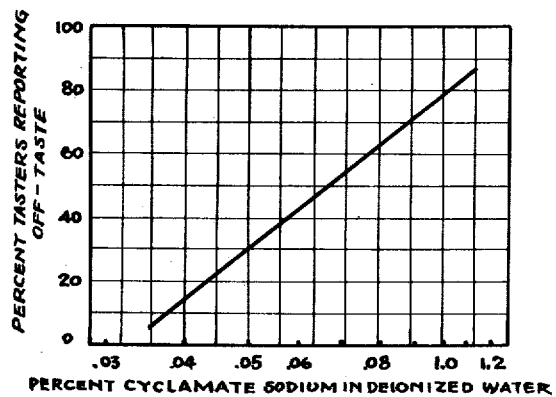
Figure 3:
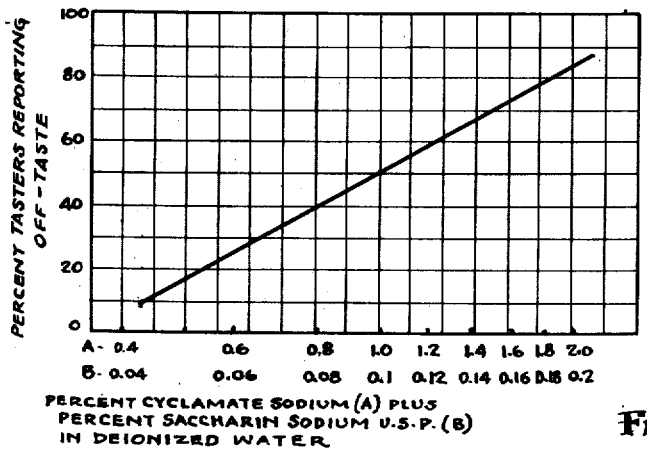

[1] Note that these concentrations taken alone result in more than 20% off-taste; see Figures 1 and 2.

The proper proportions of cyclamate and saccharin referred to herein are between 1 and 10 parts by weight of cyclamate per part by weight of saccharin. Stated in another way, as indicated in Figure 5, the percent of saccharin in the combination of cyclamate and saccharin should be between about 9% and 50% on a weight basis provided the ultimate concentration of each in solution falls within the bounds of the curve ABCDEF of Figure 5. If more than 50% saccharin is used in the combination, the desired degree of synergism is diminished below practical levels and the off-taste of the saccharin begins to predominate and reduce the effectiveness of the combination. On the other hand, if less than about 9% of saccharin is employed in the mixture, the off-taste of cyclamate begins to predominate and tends to reduce the effectiveness of the combination and the greatly enhanced sweetness of saccharin is lost.

In addition to the synergism previously described, there is another important feature and advantage of the invention, namely, the unusual ability of cyclamate to cover the off-taste of saccharin and make possible the use of much larger physical amounts of saccharin without increased off-taste. Referring to Figure 4, for instance, it will be seen that the 20% off-taste concentration of saccharin sodium is about 0.021%. This means that 20% of the population will report an off-taste in this or higher concentrations. When 10 parts by weight of cyclamate sodium is added to saccharin sodium, the 20% off-taste concentration of the mixture is 0.53% cyclamate and 0.053% saccharin. In other words, the off-taste concentration for saccharin has been raised from 0.021% when used alone to 0.053% when used in combination with cyclamate. This represents about a 150% increase in the physical amount of saccharin sodium which can be tolerated by 80% of the population. As will be seen from Table I, the 20% off-taste concentration of saccharin in the various combinations is always substantially greater than the 20% off-taste concentration of saccharin sodium alone. In the combinations listed the physical amount of saccharin which can be tolerated by 80% of the population ranges from about 140% to about 600% more than when saccharin is used alone.

Saccharin also has the unusual property of raising the 20% off-taste concentration of cyclamate, although the increase is not so striking. The 20% off-taste concentration of cyclamate sodium alone is about 0.43%. In the 4.5–1 and 10–1 combinations (Table I) it will be observed that the 20% off-taste concentration of cyclamate sodium has been raised substantially above 0.43% which means that 80% of the population can be expected to tolerate more cyclamate sodium without additional off-taste than when cyclamate sodium is used alone.

The cyclamates and saccharins may be combined in any convenient form in the practice of this invention. Aqueous solutions of the combination are especially suitable but as will be seen from the examples, the combination may take any dry form such as tablet, granulation or the like. It is contemplated, of course, that the combination sweeteners of this invention may be used in beverages, in syrups, in pastries, candies, puddings, and other desserts, and in fact, in any item or product in which sweetness is desirable. The addition of thickeners, flavors, fruit acids, natural sugars and other items which have an effect upon the taste buds may change the ratios and concentrations established herein as being critical. Therefore, it is more desirable to make any comparative studies in the absence of such ingredients which have some effect on the taste buds.

In the preparation of tablets and granulations it is expected that any or all of the customarily employed fillers and adjuvants may be added. Binders such as lactose and starch, granulating agents such as carboxymethylcellulose and acacia, lubricating agents such as talc and magnesium stearate, effervescent systems as shown in the following examples, and other tabletting assistants and extenders are all contemplated. In the average tablet designed to equal about one teaspoonful of sucrose in sweetness, one may use about 15 milligrams of cyclamate and 15 milligrams of saccharin, or one may concurrently increase the cyclamate up to about 50 mg. while reducing the saccharin to about 5 mg.

It is intended herein that any non-toxic or pharmaceutically acceptable salt of cyclamate or saccharin may be used in the practice of the invention. Of special interest are the non-toxic alkali metal and alkaline earth metal salts of the two sweeteners. Sodium and calcium salts are best known and are preferred because of their availability and low toxicity. Since the sweetness of the salt is believed to be due to the cyclamate and saccharin ion, it will be apparent that other non-toxic salts may be employed if desired. For instance, the potassium salt could be used although it is presently more expensive. The ammonium salts are also suitable as are the amine salts such as the glycine ethanolamine and diethanolamine salts, and salts of other non-toxic organic bases. While some of the detailed data presented herein was obtained on the sodium salts of cyclamate and saccharin, other work on the calcium salts has been done and has proven that the calcium salts exhibit results which are not significantly different from those of the sodium salts.

The following examples are given in order to fully illustrate the invention but it should be understood that the invention is not to be limited by the examples. In the examples the proportions are given in parts by weight unless otherwise indicated.

EXAMPLE I

A mixture of dry powdered materials was prepared according to the following formula:

Cyclamate sodium or calcium _____ g__ 10
Saccharin _____ g__ 1

The powders are blended well and placed in a suitable container such as a bottle or capsule. If desired, an inert diluent such as diatomaceous earth or the like may be blended with said powders. The dry powder may be dissolved in liquid for use, or it may be sprinkled onto foods in the same manner that sugar is used. Even in relatively high concentration up to 0.05% of saccharin (in solution), the mixture will not have an off-taste to those who normally get an off-taste from saccharin alone,

EXAMPLE II

A granulation was made up according to the following formula:

| | |
|---|---|
| Cyclamate sodium or calcium pounds | 5 |
| Saccharin do | 0.5 |
| Acacia do | 15 |
| 50% ethanol-water | q. s. |

Mix the powders thoroughly and mass with the ethanol-water. Pass through a 30-mesh screen. Dry in circulating air at 105° F.–120° F. Grind to 60 mesh.

The resulting granulation is dry and free-flowing. It may be packaged in numerous ways including a shaker bottle from which it can be dispensed in small amounts into foods and drinks as a table preparation.

EXAMPLE III

A granulation is made up as follows:

| | |
|---|---|
| Cyclamate sodium or calcium pounds | 5 |
| Saccharin do | 1.25 |
| Carboxymethylcellulose, 15 cps do | 15 |
| Water | q. s. |

Mix powders thoroughly and add water to mass for granulation. Pass through a 12-mesh screen. Dry in warm air and grind to 60-mesh size. This granulation can be used by persons who normally get an off-taste from saccharin, without detecting an off-taste.

EXAMPLE IV

Tablets were made up to contain the following ingredients. Amounts are on a per tablet basis:

| | Mg. |
|---|---|
| Cyclamate sodium | 125.0 |
| Saccharin soluble | 12.0 |
| Soda ash | 18.0 |
| Sodium bicarbonate | 7.0 |
| Acacia | 3.0 |
| Water | 15.0 |
| Tartaric acid | 21.5 |
| Sodium citrate | 3.9 |
| Sodium benzoate | 4.0 |
| Saccharin insoluble | 0.5 |
| Soda ash | 1.0 |

Make a solution of acacia and water and add the first four powders. Pass through a 14-mesh screen and dry. Blend with the last five ingredients and compress into tablets. A tablet weighs about 195 mg. and is equivalent in sweetness to about 2 or 2½ teaspoonful of sugar. More important the tablet does not give an off-taste even to saccharin sensitive people. The tablet is effervescent to speed disintegration.

EXAMPLE V

Tablets were made up according to the following formula in which amounts are on a per tablet basis:

| | Mg. |
|---|---|
| Cyclamate sodium | 90.0 |
| Saccharin soluble | 43.0 |
| Soda ash | 12.0 |
| Sodium bicarbonate | 40.0 |
| Acacia | 5.0 |
| Water | 25.0 |
| Tartaric acid | 13.4 |
| Sodium citrate | 3.7 |
| Sodium benzoate | 5.0 |
| Saccharin insoluble | 2.0 |
| Soda ash | 1.0 |

The tablet is prepared in the same manner as in Example IV. It is very sweet but even a majority of saccharin sensitive people will not get an off-taste from the tablet when used in reasonable concentration.

EXAMPLE VI

A sweetening powder composition is made according to the following directions:

| | |
|---|---|
| Cyclamate calcium lbs | 75 |
| Acacia U. S. P. lbs | 700.88 |
| Saccharin calcium oz | 120 |
| 3A alcohol lbs | 200 |

Grind the cyclamate calcium through a 40-mesh screen on a Fitzmill at high speed. Mix one part by weight each of cyclamate calcium and acacia in a Dole mixer. Dissolve the saccharin calcium in a portion of the 3A alcohol and add to the mixture. Add additional 3A alcohol to thoroughly wet the mixture. Prepare an alcohol-water mixture by combining 37.5 lbs. of the 3A alcohol with 16.5 gallons of distilled water and add the alcohol-water mixture to the powders slowly until the granulation is of proper consistency. Granulate through a ⅝" band on a Colton rotary granulator and spread on trays and dry at 120° F. Grind the dry granulation through a 30-mesh screen on the Fitzmill at high speed and thoroughly blend the ground mixture.

EXAMPLE VII

Tablets of the sweetening composition of this invention are prepared according to the following directions:

| | Pounds |
|---|---|
| Cyclamate calcium | 347.23 |
| Saccharin calcium | 34.72 |
| Citric acid U. S. P. | 321.56 |
| Potassium carbonate | 344.05 |
| Polyethylene glycol (M. W. 6000) | 34.72 |

Charge the citric acid through a Fitzmill at medium speed and 16-mesh screen. Charge the cyclamate calcium and the saccharin calcium into a Dole mixer along with the citric acid and add sufficient distilled water to mass. Granulate through the ⅝" band on a Colton rotary granulator and dry the granulation at 140–145° F. in a hot air drier. Meanwhile, charge the potassium carbonate through a Fitzmill 40-mesh screen at high speed and dry at 140–145° F. in a hot air drier. Chill the polyethylene glycol by mixing with Dry Ice and mill the Dry Ice in polyethylene mixture through a 60-mesh screen on the Fitzmill at high speed. Spread thin on the trays to sublime the Dry Ice.

Regranulate the dry mixture of sweetening powders through a 16-mesh screen and add the dried potassium carbonate and the cold polyethylene glycol. After thorough mixing, the materials are compressed into tablets weighing approximately 150 mg. each and containing 50 mg. of cyclamate calcium and 5 mg. of saccharin calcium in each tablet.

EXAMPLE VIII

Tablets are made up according to the following directions:

| | Pounds |
|---|---|
| Cyclamate sodium | 617.30 |
| Saccharin sodium | 61.73 |
| Soda ash | 76.79 |
| Acacia U. S. P. | 14.57 |
| Sodium citrate anhydrous | 69.63 |
| Tartaric acid U. S. P. | 316.67 |
| Sodium benzoate | 87.41 |

Blend thoroughly one part each of cyclamate sodium, saccharin sodium and soda ash. Dissolve the acacia in 12 gallons of distilled water and add the acacia solution plus additional distilled water to the powder mixture and mix thoroughly. Pass through a continuous drier until the moisture is below 0.9%. Blend the above granulation in a mixture with the additional sodium ash, sodium citrate, tartaric acid and sodium benzoate, and compress the blended mixture into tablets weighing approximately 75 mg. each and containing 50 mg. of cyclamate sodium and 5 mg. of saccharin sodium in each tablet.

EXAMPLE IX

A sweetening solution is made up according to the following directions:

| | | |
|---|---|---|
| Benzoic acid U. S. P | lbs | 12.52 |
| Aseptoform M | oz | 100.14 |
| Cyclamate sodium | lbs | 751.88 |
| Saccharin sodium | lbs | 75.11 |
| Distilled water q. s | gallons | 1500 |

Heat 275 gallons of the distilled water to 90–95° C. and add and dissolve the benzoic acid and aseptoform M. Add distilled water to bring the volume to about 1125 gallons and cool to room temperature. Add and dissolve the cyclamate sodium and the saccharin sodium and add additional distilled water to bring the volume to 1500 gallons. Filter and bottle the solution which is a concentrated solution containing 6% cyclamate sodium and 0.6% of saccharin sodium.

In place of cyclamate sodium and saccharin sodium in this example, one may substitute in identical proportions cyclamate calcium and saccharin calcium.

This is a continuation-in-part of Helgren Serial No. 392,757, filed November 17, 1953, now abandoned.

Others may practice the invention in any of the numerous ways which will be suggested to one skilled in the art upon a reading of this specification. It is intended that all such practice of the invention be included hereunder provided it falls within the scope of the appended claims.

I claim:

1. A new composition of matter comprising from about 6%–67% by weight of a physiologically acceptable salt of cyclamate and from about 0.6%–6.7% by weight of a physiologically acceptable salt of saccharin in which said saccharin constitutes between about 9% and about 50% of the total weight of said salts, said composition when dissolved in sufficient edible aqueous media to give a solution in which the concentrations of said cyclamate and said saccharin fall within the curve ABCDEF of Figure 5, resulting in a solution giving significant off-taste in not more than about 20% of the population.

2. The composition of claim 1 in combination with a solid pharmaceutical carrier and compressed into tablet form.

3. A sweetening tablet comprising the combination of about 15–50 mg. of a physiologically acceptable salt of cyclamate with about 5–15 mg. of a physiologically acceptable salt of saccharin and a solid pharmaceutical carrier, said tablet when dissolved in sufficient edible aqueous media to give a solution in which the concentrations of said cyclamate and said sacharin fall within the curve ABCDEF of Figure 5, resulting in a solution giving significant off-taste in not more than about 20% of the population.

4. A concentrated aqueous sweetening solution comprising not more than about 15% w./v. of a physiologically acceptable salt of cyclamate and from about 1.5% to about 15% w./v. of a physiologically acceptable salt of saccharin with the cyclamate never being less than the saccharin, said solution when diluted with sufficient edible aqueous media to give a solution in which the concentrations of said cyclamate and said saccharin fall within the curve ABCDEF of Figure 5, results in a product giving significant off-taste in not more than about 20% of the population.

5. The method of inhibiting the off-taste of a physiologically acceptable salt of saccharin for at least about 80% of the population at concentrations above about 0.021% w./v. which comprises adding to each part by weight of said saccharin from one to ten parts by weight of a physiologically acceptable salt of cyclamate, the concentrations of said saccharin and said cyclamate in ultimate solution falling within the curve ABCDEF of Figure 5.

6. A new composition of matter comprising a mixture of one part by weight of saccharin sodium and from about one to about ten parts by weight of cyclamate sodium, which when dissolved in edible aqueous media results in a solution having said cyclamate and said saccharin present in concentrations within the curve ABCDEF in Figure 5, said solution giving significant off-taste in not more than about 20% of the population.

7. A new composition of matter comprising a mixture of one part by weight of saccharin calcium and from about one to about ten parts by weight of cyclamate calcium, which when dissolved in edible aqueous media results in a solution having said cyclamate and said saccharin present in concentrations within the curve ABCDEF in Figure 5, said solution giving significant off-taste in not more than about 20% of the population.

8. A tablet according to claim 3 in which about 50 mg. of cyclamate sodium and about 5 mg. of saccharin sodium are employed.

9. A tablet according to claim 3 in which about 50 mg. of cyclamate calcium and about 5 mg. of saccharin calcium are employed.

10. A concentrated aqueous solution according to claim 4 in which about 6% w./v. of cyclamate sodium and about 0.6% w./v. of saccharin sodium are employed.

11. A concentrated aqueous solution according to claim 4 in which about 6% w./v. of cyclamate calcium and about 0.6% w./v. of saccharin calcium are employed.

References Cited in the file of this patent

UNITED STATES PATENTS

| 2,629,665 | Gordon | Feb. 24, 1953 |
|---|---|---|
| 2,653,105 | Gordon | Sept. 22, 1953 |

FOREIGN PATENTS

| 314,500 | Great Britain | June 28, 1929 |
|---|---|---|

OTHER REFERENCES

"The Journal of the American Medical Association," vol. 1143, No. 7, June 17, 1950, page 13 adv.

"Tablet Manufacture," by Joseph R. Wood, J. B. Lippincott Co., Philadelphia, Pa., pages 55 and 202.

UNITED STATES PATENT OFFICE

CERTIFICATE OF CORRECTION

Patent No. 2,803,551

August 20, 1957

Fred J. Helgren

It is hereby certified that error appears in the above numbered patent requiring correction and that the said Letters Patent should read as corrected below.

In the drawings, Sheet 1, Fig. 2, for the numbers appearing at the bottom of the graph reading ".03, .04, .05, .06, and .08" read -- 0.3, 0.4, 0.5, 0.6, and 0.8 --.

Signed and sealed this 26th day of November 1957.

(SEAL)
Attest:

KARL H. AXLINE
Attesting Officer

ROBERT C. WATSON
Commissioner of Patents